(12) United States Patent
Hamai et al.

(10) Patent No.: US 6,449,668 B1
(45) Date of Patent: Sep. 10, 2002

(54) AV DATA INPUT/OUTPUT DEVICE

(75) Inventors: Shinji Hamai, Osaka; Hiroshi Kase, Moriguchi; Yoshihiro Morioka, Kashiba; Hiroshi Mitani, Shijonawate, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/380,745

(22) PCT Filed: Jan. 14, 1999

(86) PCT No.: PCT/JP99/00100

§ 371 (c)(1),
(2), (4) Date: Sep. 13, 1999

(87) PCT Pub. No.: WO99/36911

PCT Pub. Date: Jul. 22, 1999

(30) Foreign Application Priority Data

Jan. 16, 1998 (JP) .......................................... 10-006666
Jun. 4, 1998 (JP) .......................................... 10-155555
Nov. 18, 1998 (JP) .......................................... 10-328628

(51) Int. Cl.[7] .............................................. G06F 13/14
(52) U.S. Cl. ........................... 710/52; 710/35; 709/203; 711/113
(58) Field of Search ...................... 710/52, 35; 709/203; 711/113

(56) References Cited

U.S. PATENT DOCUMENTS

| | | | | |
|---|---|---|---|---|
| 4,860,193 A | * | 8/1989 | Bentley et al. | 364/200 |
| 4,931,924 A | * | 6/1990 | Kageura | 364/200 |
| 5,134,563 A | * | 7/1992 | Tayler et al. | 395/250 |
| 5,146,576 A | * | 9/1992 | Bearrdsley et al. | 395/425 |
| 5,394,526 A | * | 2/1995 | Crouse et al. | 395/200 |
| 5,412,780 A | * | 5/1995 | Rushton | 395/250 |
| 5,566,315 A | * | 10/1996 | Milillo et al. | 395/440 |
| 5,603,058 A | * | 2/1997 | Belknap et al. | 395/855 |
| 5,696,991 A | * | 12/1997 | Chang | 395/872 |
| 5,778,420 A | * | 7/1998 | Shitara et al. | 711/113 |
| 5,903,775 A | * | 5/1999 | Murray | 395/853 |
| 5,913,028 A | * | 6/1999 | Wang et al. | 395/200.33 |
| 5,944,802 A | * | 8/1999 | Bello et al. | 710/52 |
| 5,968,147 A | * | 10/1999 | Polfer et al. | 710/52 |
| 6,226,443 B1 | | 5/2001 | Morioka et al. | |
| 6,324,334 B1 | * | 11/2001 | Morioka et al. | 386/52 |

FOREIGN PATENT DOCUMENTS

| | | |
|---|---|---|
| JP | 6-314251 | 11/1994 |
| JP | 9-16343 A | 1/1997 |
| JP | 9-163312 A | 6/1997 |
| JP | 9-167442 | 6/1997 |

* cited by examiner

*Primary Examiner*—Jeffrey Gaffin
*Assistant Examiner*—Abdelmoniem Elamin
(74) *Attorney, Agent, or Firm*—Smith, Gambrell & Russell, LLP

(57) ABSTRACT

A controller issues a command to an HDD interface to transfer AV data stored in HDDs to a memory. The HDD interface, in compliance with the command, transfers the AV data stored in the HDDs to a memory mapped on a bus. A memory controller reads the AV data out of the bus, and writes the AV data into the memory. The controller outputs the address of the AV data to be outputted to the memory controller. The memory controller reads out the AV data of the designated address, and outputs them to an AV data output interface. And the AV data output interface outputs the AV data. The controller issues a command to the HDD interface memory to record the AV data stored in the memory into the HDDs. The HDD interface, in compliance with the command, reads the data out of a memory mapped on the bus, and stores them in the HDDs. The memory controller reads the AV data out of the memory, and outputs them to the bus. At the same time, the controller designates to the memory controller the address in the memory into which the AV data inputted from the AV data input interface are to be written. The memory controller reads the AV data out of the AV data input interface, and writes them into the designated memory. By accomplishing this series of actions in synchronism with the frame period, AV data are stored in the HDDs, and also AV data stored in the HDDs are outputted.

8 Claims, 14 Drawing Sheets

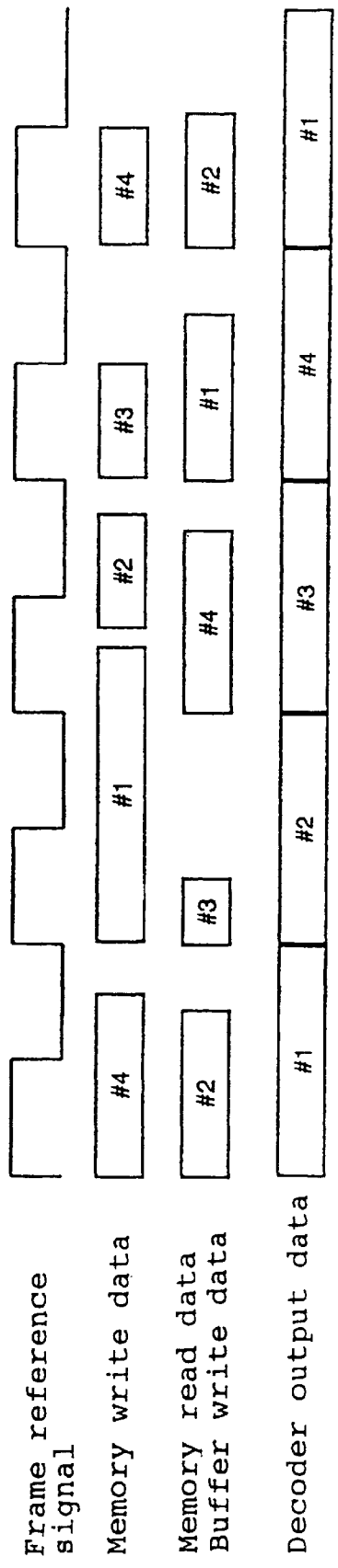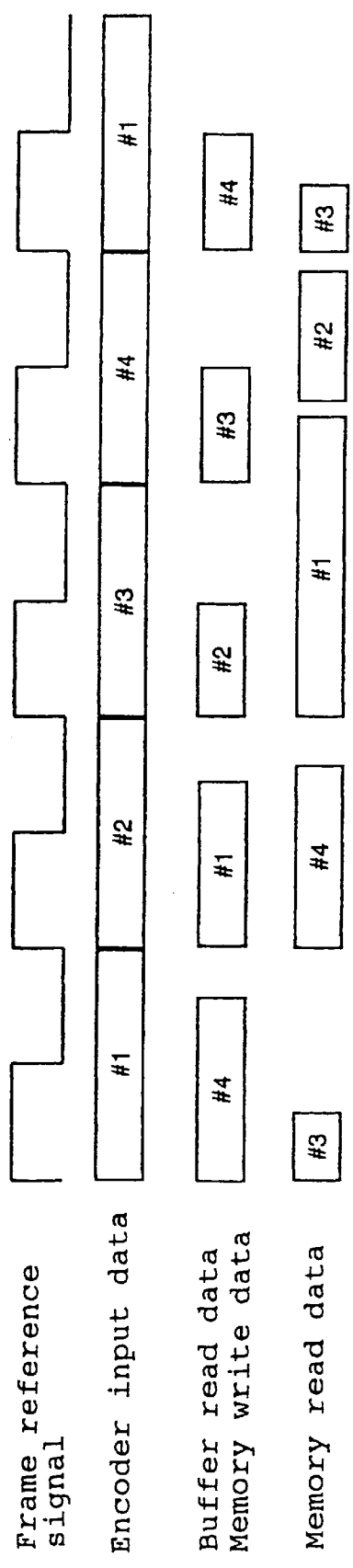

AV DATA INPUT/OUTPUT DEVICE

TECHNICAL FIELD

The present invention relates to an apparatus for storing, distributing or editing video data or audio data resulting from the digitization of video signals and audio signals.

BACKGROUND ART

There have been developed nonlinear editors (e.g. the Japanese Patent Application No. 8-176934) for editing pictures and sounds on a computer by connecting a recording/playback apparatus (VCR, video camera, hard disk or the like) via a dedicated interface or the bus of the computer and transferring data, as well as image servers for distributing video and audio data stored on a hard disk. Since such an apparatus involves the connection of a device which, such as a VCR, transfers data at a fixed rate and another which, such as a hard disk, transfers data at an unfixed rate, gives rise to a situation in which, in the event of a temporary delay in the transfer from the hard disk, some data are skipped. To solve this point, there is a method of outputting data while they are scheduled. FIG. 15 is a configurational diagram of a conventional system using this method.

An HDD 7 in which video data-are stored is connected to the bus of a computer, e.g. a PCI bus 4, via an SCSI Host Adapter (hereinafter SCSI HA) 6. A CPU 1 and a main memory 2 are connected by a CPU bus and further connected to the PCI bus 4 via a bridge 5. A data input/output circuit 100 comprises a decoder 13 for converting video and audio data into video signals and audio signals, an internal bus 11 for distributing video and audio data from the PCI bus 4, and a control circuit 101 for reading video and audio data out of a main memory 2 and distributing them to the decoder 13. The data input/output circuit 100 is also connected to the PCI bus 4.

When video and audio data are to be outputted to the HDD 7, the CPU 1 issues a command to the input/output circuit 100 to transfer the video and audio data to the memory 2. The data input/output circuit 100 encodes the inputted video and audio signals by an encoder 103, and transfers the generated video and audio data to the memory 2 via the PCI bus 4. Further, the CPU 1 issues a command to the SCSIHA 6 to store the video and audio data stored in the memory 2 to the HDD 7. The SCSIHA 6, in compliance with the command, transfers the video and audio data stored in the memory 2 via the PCI bus 4, and stores them in the HDD 7.

When the video and audio data stored in the HDD 7 are to be outputted from the video output circuit 100, the CPU 1 issues a command to the SCSIHA 6 to transfer desired data to the main memory 2. The SCSIHA 6, in compliance with the command so issued, reads the video and audio data out of the HDD 7, and writes them into the main memory 2. After that, the CPU 1 issues a command to the data output circuit 100 to transfer the video and audio data written into the main memory 2 to the decoder 13. The control circuit 101, in response to this command, reads the video and audio data out of the memory 2 in accordance with a frame reference signal inputted from outside, and outputs them to the decoder. The decoder, decoding the inputted video and audio data, and outputs them externally as video and audio signals. It externally outputs a plurality of uninterrupted video and audio signals, repeated frame by frame or in some other suitable units.

The method described above, whereby the same video and audio data are transferred via the same PCI bus 4, involves the problem of low utilization efficiency of the PCI bus. That is, it was difficult to configure an image server for outputting a plurality of video and audio signals by using a plurality of data input/output circuits.

On the other hand, it is essential for an image server to secure. reliability against any HDD trouble. Known techniques against HDD trouble include RAID. According to RAID, a plurality of HDDs are used, and an SCSIHA generates a parity from data to be recorded in the HDDs, and records the parity in the HDDs 7. When any HDD runs into trouble, the data recorded in the failed HDD are regenerated from the data and parity recorded in the remaining HDDs.

However, an SCSIHA having the conventional RAID function had only a small block for parity generation to adequately handle computer data. It is known that recording or reproducing with a small block relative to the HDD size results in a lower speed than recording or reproducing with a large block. In this context, the small block size refers to 512 bytes, which is the usual sector size of an HDD, and the large block size, generally 64 KB, 128 KB or more. Furthermore, an SCSII/F having a RAID function has a buffer memory for parity calculation and a CPU to control it, whose high cost poses another problem.

DISCLOSURE OF THE INVENTION

The present invention is intended to solve these problems with AV data input/output apparatuses according to the prior art.

According to a first aspect of the invention, there is provided an AV data input/output apparatus, having a second bus connected to a PCI bus, a memory connected to the second bus, and a decoder and an encoder connected by a buffer in-between, for storing AV data in an HDD. The AV data input/output apparatus according to the invention can increase the efficiency of PCI bus utilization and transfer AV data at a higher data rate by having an SCSIHA, when AV data are to be stored, directly read the AV data out of the memory and recording them into the HDDs and having the SCSIHA, when the AV data are to be outputted, directly write the AV data stored in the HDDs into the memory, so that the AV data need to be transferred via the PCI bus no more than once. Furthermore, the first aspect of the invention makes possible even more efficient transfers via the PCI bus by suspending, when it is to be accessed, data transfers from the memory to the decoder and data transfers from the encoder to the memory, and accessing the PCI bus.

According to a second aspect of the invention, a parity is calculated from the AV data outputted by the decoder in addition to the first aspect of the invention. The second aspect of the invention makes possible realization of a highly reliable AV data input/output circuit against HDD trouble by merely adding a parity calculating circuit and a data recalculating circuit. Furthermore, regarding the accessing of HDDs, it enables, as does in the first aspect of the invention, the maximum possible memory access to be accomplished, resulting in freedom from any drop in recording rate at the time of parity generation.

BRIEF DESCRIPTION OF DRAWINGS

FIG. 7 is an access timing chart of the memory in the first embodiment of the invention;

FIG. 8 is an access timing chart of the memory in the first embodiment of the invention;

BEST MODE FOR CARRYING OUT THE INVENTION

Embodiments of the present invention will be described below with reference to drawings.

Embodiment 1

Figure 1:
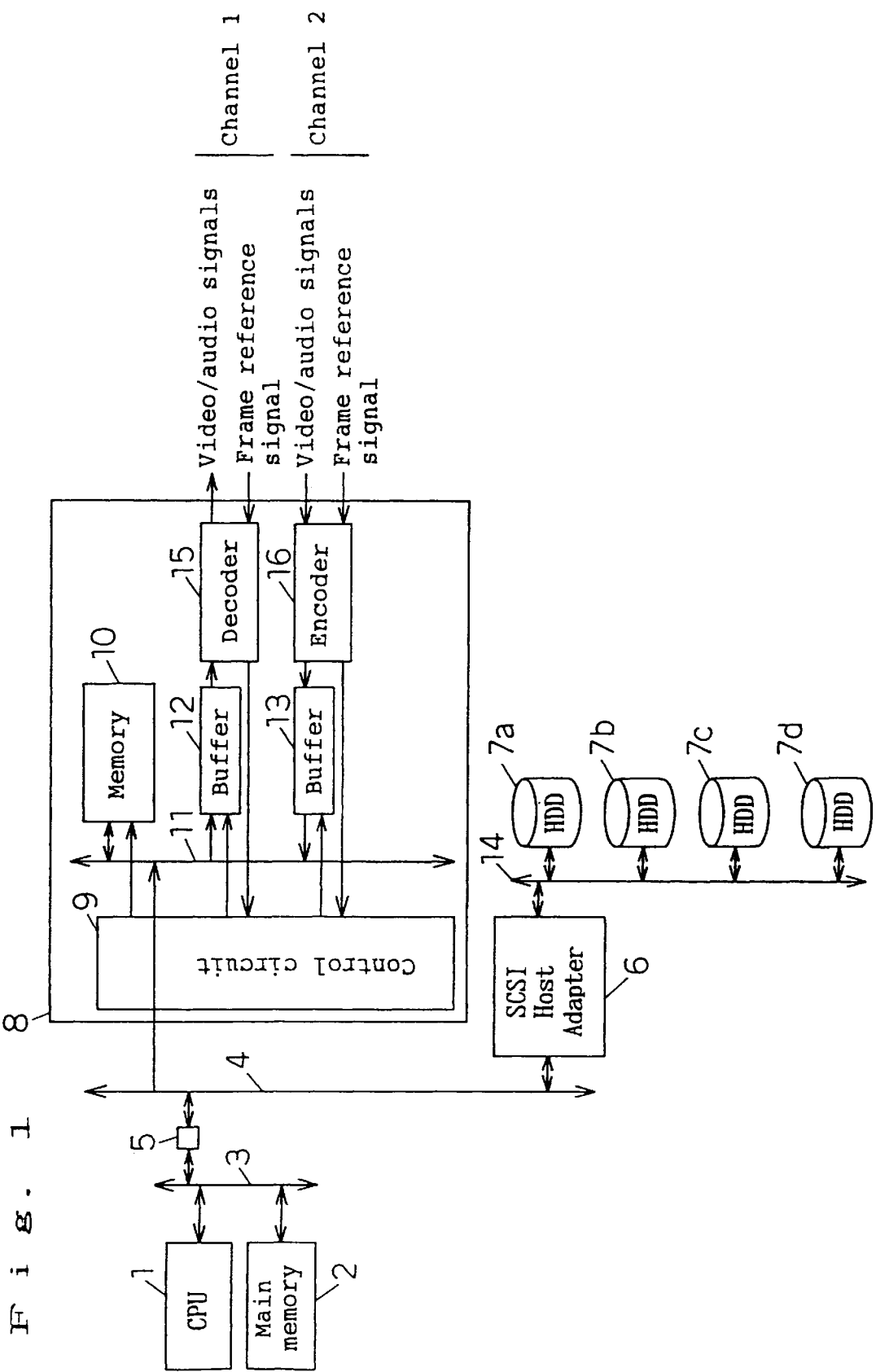
FIG. 1 is a block diagram of an AV data input/output apparatus, which is a first embodiment of the present invention.

FIG. 1 is a diagram illustrating a first embodiment of carrying out the invention. Reference numeral 1 denotes a CPU; 2, a main memory; 3, a CPU bus; 4, a PCI bus; 5, a bridge; 6, an SCSI Host Adapter (hereinafter SCSI HA); 7a to 7d, a plurality of HDDs; 8, a data output circuit; 9, a control circuit; 10, a memory; 11, an internal bus; 12 and 13, a buffer; 14, an SCSI bus; 15, a decoder; and 16, an encoder.

When video and audio signals are to be outputted, the AV data stored in the HDDs 7 are outputted to the decoder 15, and the decoder 15 converts the AV data into video and audio signals and outputs them. The video and audio signals then are outputted in synchronism with a frame reference signal which is inputted. The CPU 1 sends a command to write the AV data stored in the HDDs 7 to the SCSIHA 6 in accordance with a program stored in the main memory 2. The CPU bus 3, bridge 5 and PCI bus 4 then operate transmissively. The SCSIHA 6, having received the command, reads data out of the HDDs 7 via the SCSI bus 14, and outputs them to the data input/output circuit 9 via the PCI bus 4. The control circuit 9 of the data input/output circuit 9, if the input signals are data destined for the data input/output circuit 9, writes the data into the memory 10. The buffer 12, receiving an instruction from the control circuit 9, reads a single frame equivalent of AV data in a single frame period out of the memory 10 and, after storing them within it temporarily, outputs them to the decoder 15 in a prescribed format. The decoder 15 converts the inputted AV data into video and audio signals, and outputs them.

When AV data are to be stored, video and audio signals inputted from Channel 2 are inputted to the encoder 16. The encoder 16 subjects the inputted video and audio signals to high efficiency encoding into AV data, and outputs them to the buffer 14. The control circuit 9 reads the AV data out of the buffer 14, and writes them into the memory 10.

The CPU 1 sends a command to read the data in the memory 10 to the SCSIHA 6 in accordance with a program stored in the main memory 2 and to record them in the HDDs 7. The CPU bus 3, bridge 5 and PCI bus 4 then operate transmissively. The SCSI 6, having received the command, reads data. out of the memory 10, and records the AV data into the HDDs 7 via the SCSI bus 14. The control circuit 9, if the read command of the PCI bus 4 points to the address of the memory 10, outputs the data of the request address in the memory 10 to the PCI bus 4.

Figure 2:
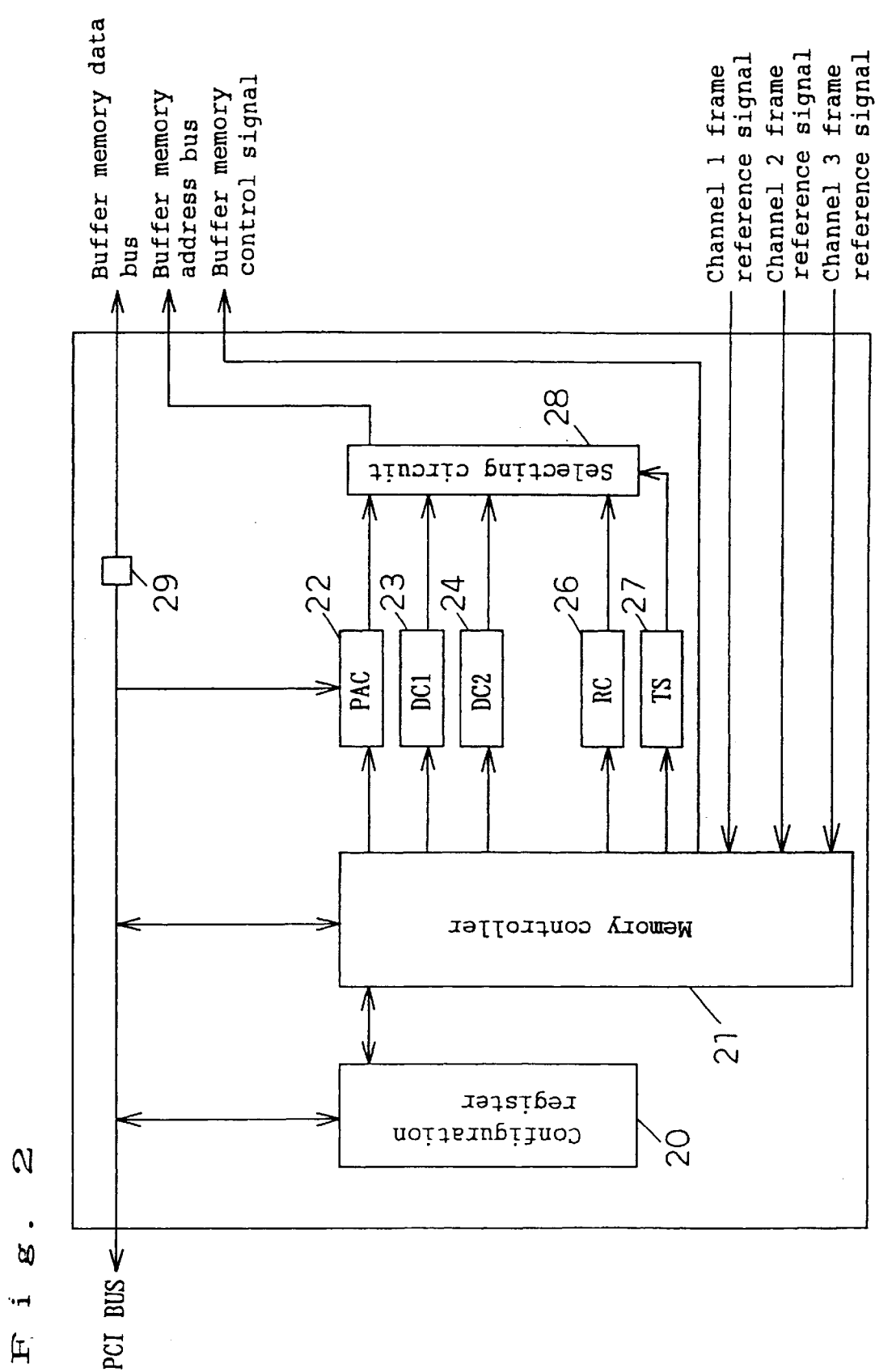
FIG. 2 is a block diagram of a data input/output circuit in the first embodiment of the invention.

FIG. 2 is a block diagram of the control circuit 9. Reference numeral 20 denotes a configuration register; 21, an address control circuit; 22, PCI address counter (PAC); 23, a video output counter 1 (DC1); 24, video input counter 2 (DC2); 26, a refresh counter (RC); 27, a target state (TS); and 28, a selecting circuit. The data input/output circuit 9 operates as a target of the PCI BUS. The register to serve that purpose is the configuration register 20. It is also used as the register for communicating with the CPU 1 to read data out of the memory 10 and output them to the buffer 12 output or to write AV data read out of the buffer 12 into the memory 10. The address control circuit 21 is a circuit for controlling the addresses and control lines of the memory 10. The PAC counts the write address of the PCI BUS to the data input/output circuit 9. The DC1 and DC2 are address counters for transferring data from the memory 10 to the buffer 12 or from the buffer 13 to the memory 10. The RC is a counter for refreshing the memory 10. The TS is a state machine to be used for controlling accesses to memories. The address selecting circuit 28 is a circuit for selecting addresses outputted by the PAC, DC1, DC2 and RC according to the state of the TS, and outputting the selected one to the memory 10.

Figure 3:
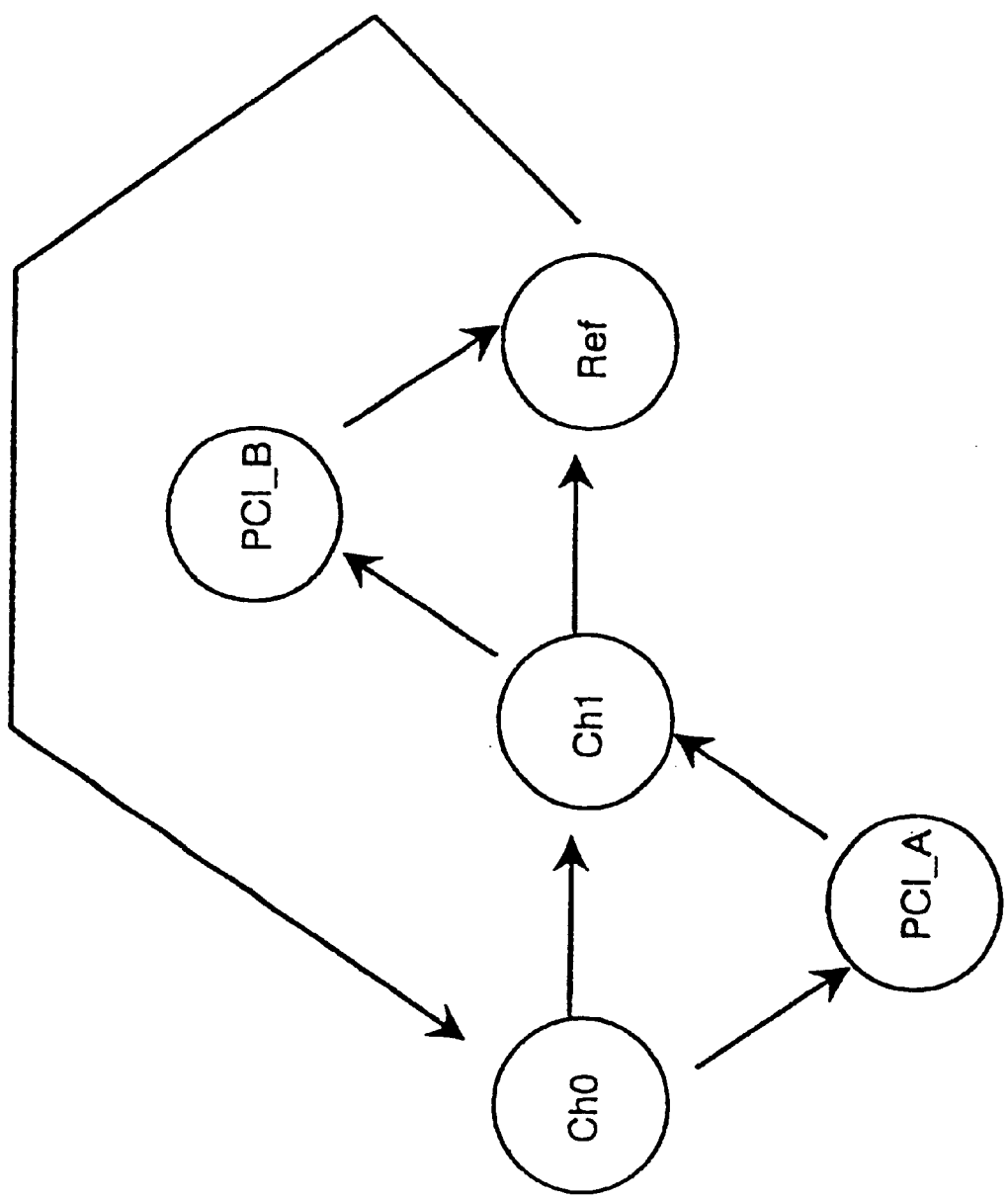
FIG. 3 is a state transition diagram of a memory control circuit in the first embodiment of the invention.

FIG. 3 shows a state transition diagram of the TS. CH0 is a phase for transferring the AV data in the memory 10 to the buffer 12 of Channel 0; and CH1, a phase for transferring AV data from the buffer 12 of Channel 1 to the memory 10; REF, a phase for refreshing the memory 10; and PCI_A and PCI_B, phases for writing write data from the PCI BUS to the memory 10.

In phase CH0, prescribed units of AV data are outputted from the memory 10 to the buffer 12. However, if the data input/output circuit 9 is accessed during a transfer, the current transfer is immediately suspended and, in the case of CH0, a transition to the PCI_A takes place. In phase CH1, prescribed units of AV data are outputted from the buffer 13 to the memory 10. However, if the data input/output circuit 9 is accessed during a transfer, the current transfer is immediately suspended, and a transition to the PCI_B phase takes place. In the PCI_A or PCI_B phase, data requested from the PCI BUS are written in or read out. After its completion, a transition takes place to CH1 in the case of PCI_A or to the REF phase in the case of PCI_B. If the transfer of prescribed units of AV data between the memory 10 and the buffer 13 has been completed in the CH0 phase, a transition to the CH1 phase takes place. If the transfer of prescribed units of AV data between the memory 10 and the buffer 12 has been completed in the CH1 phase, a transition to the REF phase takes place. In the REF phase, the memory 10 is refreshed, and a transition to the CH0 phase takes place.

When the transfer of one frame is accomplished in one frame period, nothing is-done in the CH0 or CH1 phase, and a transition to the next CH1 or REF phase takes place. For instance, if data of one frame are 128 KB, and the AV data of 128 KB of that frame are transferred to the buffer 12 in the CH0 phase, no transfer of AV data takes place until the next frame period, but an immediate transfer to the CH1 phase takes place. The frame period is determined according to the inputted frame reference signal.

The PAC, a counter for outputting the address of the PCI BUS in the data phase, sets the signal AD of the PCI BUS in the address phase of writing into or reading out of the data input/output circuit 9, and is incremented by 4 in each data phase.

The DC1 and DC2 are counters incremented at every data transfer on CH0 and CH1, respectively; the DC1 indicates the address in the memory 10 of data transferred from the memory 10 to the buffer 12, and the DC2 indicates the address in the memory 10 of data transferred from the buffer 13 to the memory 10.

The REF, a refresh counter for the memory 10, increments the RAW address by 1 every time it refreshes the memory 10.

Figure 4:
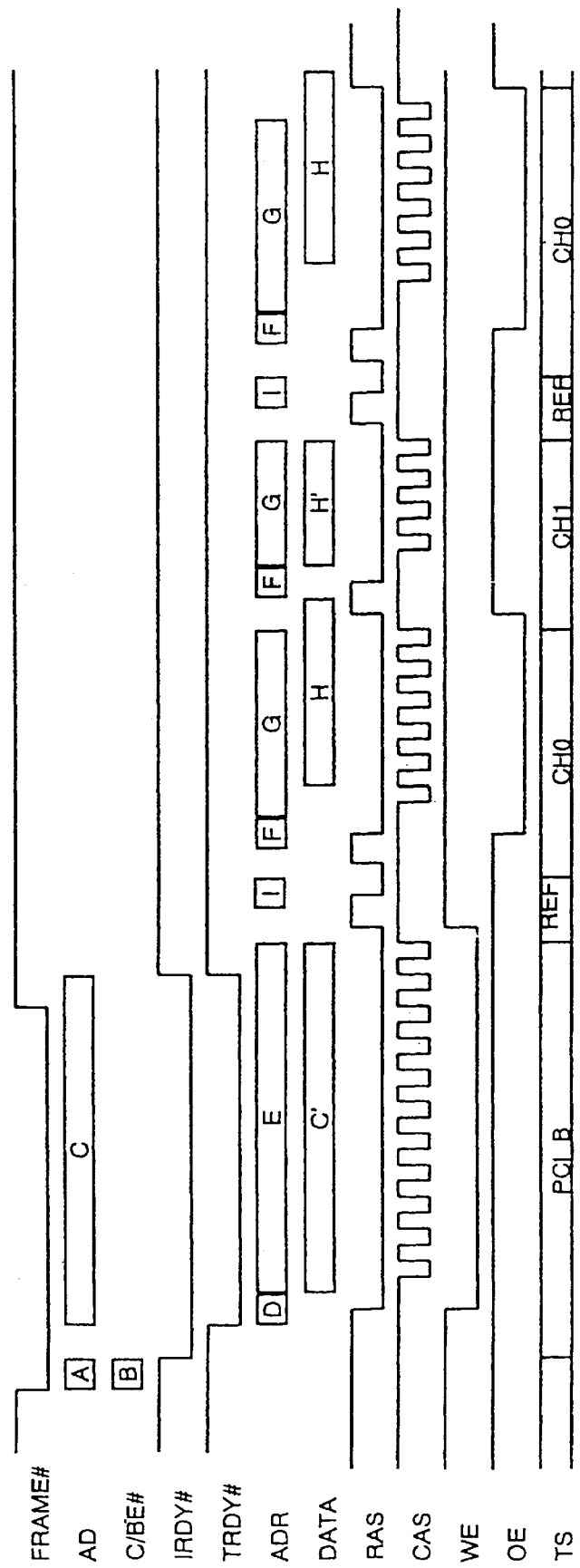
FIG. 4 is a timing chart of a second bus in the first embodiment of the invention.

FIG. 4 shows an example of address generation. FRAME#, AD, C/BE#, TRDY# and IRDY# denote signal lines of the PCI BUS. ADR denotes an address outputted to the memory 10; DATA, data flowing on the internal bus 11; RAS, CAS, WE and OE, control lines for the memory 10; and TS, the state of the state machine TS.

Writing in from the PCI BUS takes place. If address (A) is the address of the data input/output circuit 9 and C/BE# is a write command (B) when FRAME# is asserted, a transition to PCI_B takes place (if the previous state is CH1). At this time the offset part (A) in the designated address is set in PAC. After that IRDY# is asserted, and TRDY# is asserted to start a data phase. The address control circuit 21, when asserting TRDY#, outputs (D) the RAW address part of PAC to. ADR, and from the next clock onward increments PAC while outputting the CAS address part of PAC. C denotes data having been written in, and C', data on the internal bus. Upon completion of this data phase, TS transitions to the REF phase.

In the REF phase, after the value of RC is outputted to ADR and RAS is enabled, a transition to CH0 takes place. And RC is incremented by 1. In the CH0 phase, first the RAW address of DC1 is outputted (F), and then the COLUMN address of DC1 is outputted (G). If RAS, CAS, OE and WE are controlled at appropriate timings, data H are outputted from the memory 10 to the buffer 12. When a transfer of a prescribed quantity is completed, a transition to the CH1 phase takes place, and the address of DC2 is similarly outputted. In the CH1 phase, data are outputted from the buffer 13 in advance. The data are written into the output data memory 10 of the buffer 13 by controlling the RAS, CAS, OE and WE of the memory 10 matched to that timing.

Figure 5:
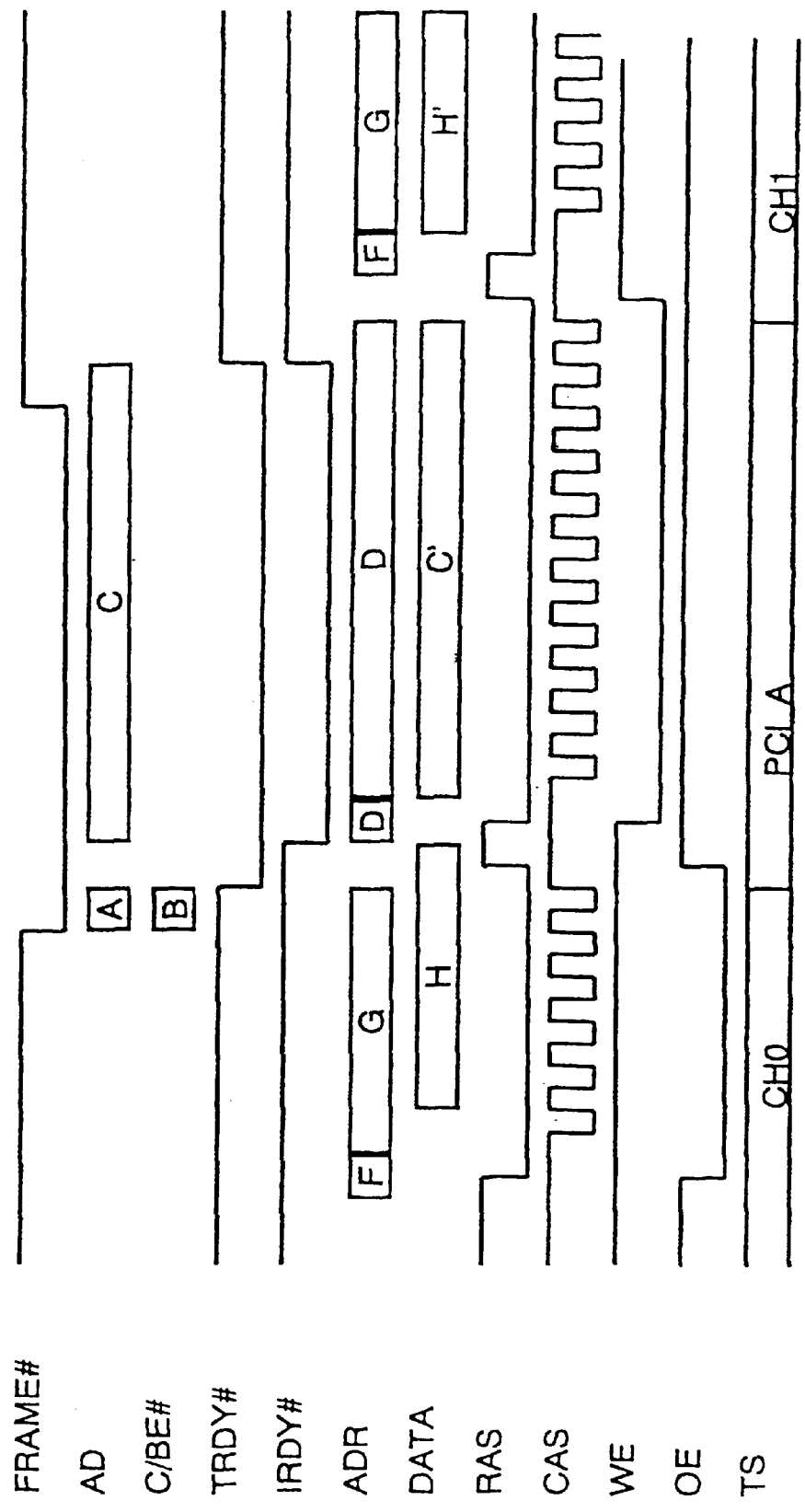
FIG. 5 is a timing chart of the second bus in the first embodiment of the invention.

FIG. 5 shows the timings when a write request is received from the PCI BUS during a data transfer. When a write request is received from the PCI BUS in a CH0 state, the address output G is immediately suspended, RAS, CAS and OE are disabled, and a transition to PCI_A takes place. The use of the memory in such a manner makes it possible to carry out a transfer in response to a write or read request from the PCI BUS without entering into a waiting state.

Figure 6:
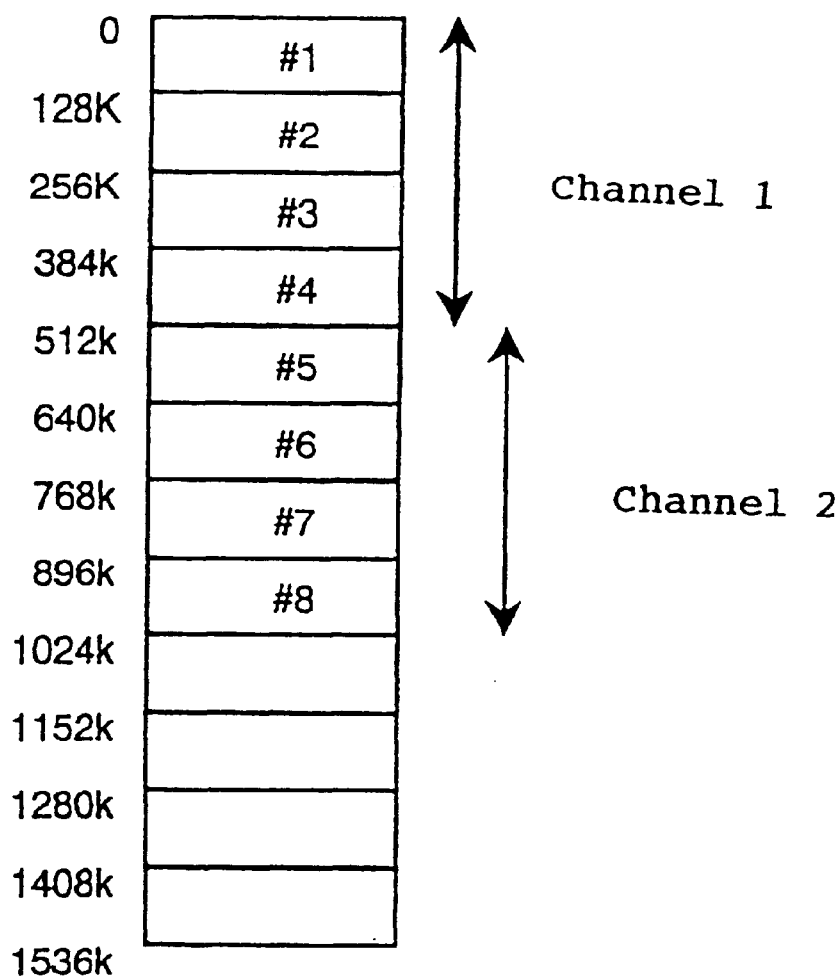
FIG. 6 is a mapping chart of a memory in the first embodiment of the invention.

FIG. 6 is a memory map of the memory 10. Here, the capacity of the memory is supposed to be a 12 frame equivalent, with each frame containing 128 KBytes of AV data. #1 and #2 through #8 are the frame numbers of AV data, with four frames being allocated to each channel. #1 through #4 are allocated to Channel 1. FIG. 7 shows the access timings of the memory 10 for Channel 1. The frame reference signal is a signal representing the start of a frame period at its leading edge. One frame of AV data is transferred from the memory 10 to the buffer 12 in each frame period. Areas #1 through #4 are used in rotation from one frame period to next. The AV data inputted to the buffer 12 are inputted to the decoder 15 in the next frame period at a prescribed timing. Writing into the memory 10 is accomplished in the area from which a transfer to the buffer 12 has taken place. For instance, after the AV data of #1 have been transferred to the buffer 12, new AV data are transferred from the HDDs 7 to area #1 in the next frame period.

FIG. 8 shows the access timings of the memory 10 to Channel 2. One frame of AV data is transferred from the buffer 13 to the memory 10 in each frame period. Areas #5 to #8 are used in turn from one frame period to next. AV data transferred-from the encoder 16 to the buffer 13 are written into the memory 10 in the next frame period. Reading of AV data out of the memory 10 takes place during the frame period following the completion of the transfer from the buffer 13 to the memory 10. For instance, AV data are read out of the memory 10 so that the AV data recorded in #4 be recorded into the HDDs 7 in the frame following the transfer of data from the buffer 13 to #4.

Controlling in the manner so far described enables AV data to be smoothly supplied to the decoder without affecting transfers over the PCI BUS. Since transfers over the PCI BUS are not affected, it is possible to enhance the efficiency of the PCI BUS and thereby to realize high speed inputting and outputting of AV data. As there is only one device for PCI transfers and any transfer to the decoder of the AV data output circuit does not stop any transfer to the PCI bus, it is possible to calculate in advance the effective rate of the PCI bus.

The method for separately transferring audio data among the AV data will further be described. Where audio data constitute part of the AV data, the control circuit 9 DMA-transfers audio data in the memory 10 to the main memory 2 in accordance with a command from the CPU 1. Or it DMA-transfers audio data in the main memory 2 to the memory 10. This makes possible mixing of AV data stored in the HDDs 7, for instance, with other audio data and externally outputting the mixed data or extraction of audio data out of inputted AV data and recording them onto a hard disk differing from the HDDs 7.

Embodiment 2

Figure 9:
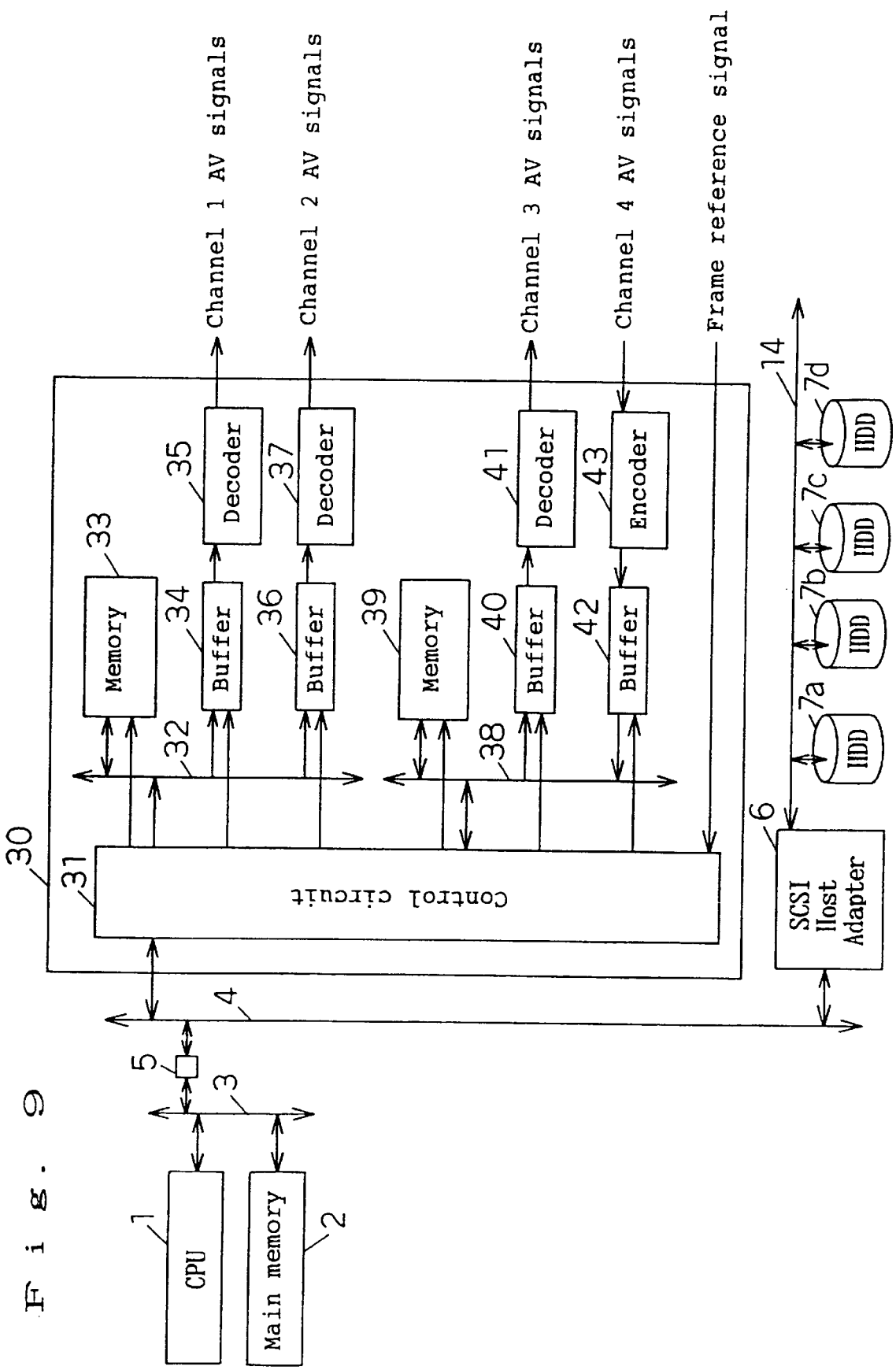
FIG. 9 is a block diagram of an AV data input/output apparatus, which is a second embodiment of the present invention.

FIG. 9 is a diagram illustrating a second embodiment of carrying out the present invention. Reference numeral 30 denotes an AV data output circuit; 31, a control circuit; 32 and 38, internal buses; 33 and 39, memories; 34, 36, 40 and 42, buffers; 35, 37 and 41, decoders; and 43, an encoder. In this embodiment, AV signals stored in HDDs are outputted over three channels while AV signals inputted over one channel are stored in HDDs.

When AV signals are to be outputted to Channel 1, AV data stored in the HDDs 7 are outputted to the decoder 35. The AV signals then are outputted in synchronism with an inputted frame reference signal. A CPU 1 sends a command to an SCSIHA 6 to transfer AV data stored in the HDDs 7 to the AV data output circuit 30 in accordance with a program stored in the main memory 2. A CPU bus 3, bridge 5 and PCI bus 4 then operate transmissively. The SCSIHA 6, having received the command, reads AV data out of the HDDs 7, and outputs them to the AV data output circuit 30 via the PCI bus 4. The control circuit 31 of the AV data output circuit 30, if the inputted data are destined for the AV data output circuit 30 and for Channel 1, writes the AV data into the memory 33. The buffer 34, at the instruction of the control circuit 31, reads a single frame equivalent of AV data out of the memory 33 in a single frame period and, after storing them within it temporarily, outputs them to the decoder 35 in a prescribed format. The decoder 35 converts the inputted AV data into AV signals, and outputs them.

When AV signals are to be outputted to Channel 2, AV data stored in the HDDs 7 are outputted to the decoder 37. The AV signals then are outputted in synchronism with an inputted frame reference signal. The CPU 1 sends a command to the SCSIHA 6 to transfer AV data stored in the HDDs 7 to the AV data output circuit 30 in. accordance with a program stored in the main memory 2. The CPU bus 3, bridge 5 and PCI bus 4 then operate transmissively. The SCSIHA 6, having received the command, reads AV data out of the HDDs 7, and outputs them to the AV data output circuit 30 via the PCI bus 4. The control circuit 31 of the AV data output circuit 30, if the inputted data are destined for the AV data output circuit 30 and for Channel 2, writes the AV data into the memory 33. The buffer 36, at the instruction of the control circuit 31, reads a single frame equivalent of AV data out of the memory 33 in a single frame period and, after storing them within it temporarily, outputs them to the decoder 37 in a prescribed format. The decoder 37 converts the inputted AV data into AV signals, and outputs them.

When AV signals are to be outputted to Channel 3, AV data stored in the HDDs 7 are outputted to the decoder 41. The AV signals then are outputted in synchronism with an inputted frame reference signal. The CPU 1 sends a command to the SCSIHA 6 to transfer AV data stored in the HDDs 7 to the AV data output circuit 30 in accordance with a program stored in the main memory 2. The CPU bus 3, bridge 5 and PCI bus 4 then operate transmissively. The SCSIHA 6, having received the command, reads AV data out of the HDDs 7, and outputs them to the AV data output circuit 30 via the PCI bus 4. The control circuit 31 of the AV data output circuit 30, if the inputted data are destined for the AV data output circuit 30 and for Channel 3, writes the AV data into the memory 39. The buffer 42, at the instruction of the control circuit 31, reads a single frame equivalent of AV data out of the memory 39 in a single frame period and, after storing them within it temporarily, outputs them to the decoder 41 in a prescribed format. The decoder 41 converts the inputted AV data into AV signals, and outputs them.

AV signals are inputted from Channel 4 and stored in the HDDs 7. The inputted AV signals are inputted to the encoder 43, and converted into AV data. The encoder 43 outputs the AV data to the buffer 41 in a prescribed format. The buffer 41, after storing the inputted AV data within it temporarily, outputs them to the internal bus 38 in accordance with the instruction of the control circuit 31. The control circuit 31 controls the buffer 42 and the memory 39 so as to read a single frame equivalent of data out of the buffer 42 in a single frame period and to record them into the memory 39.

Figure 10:
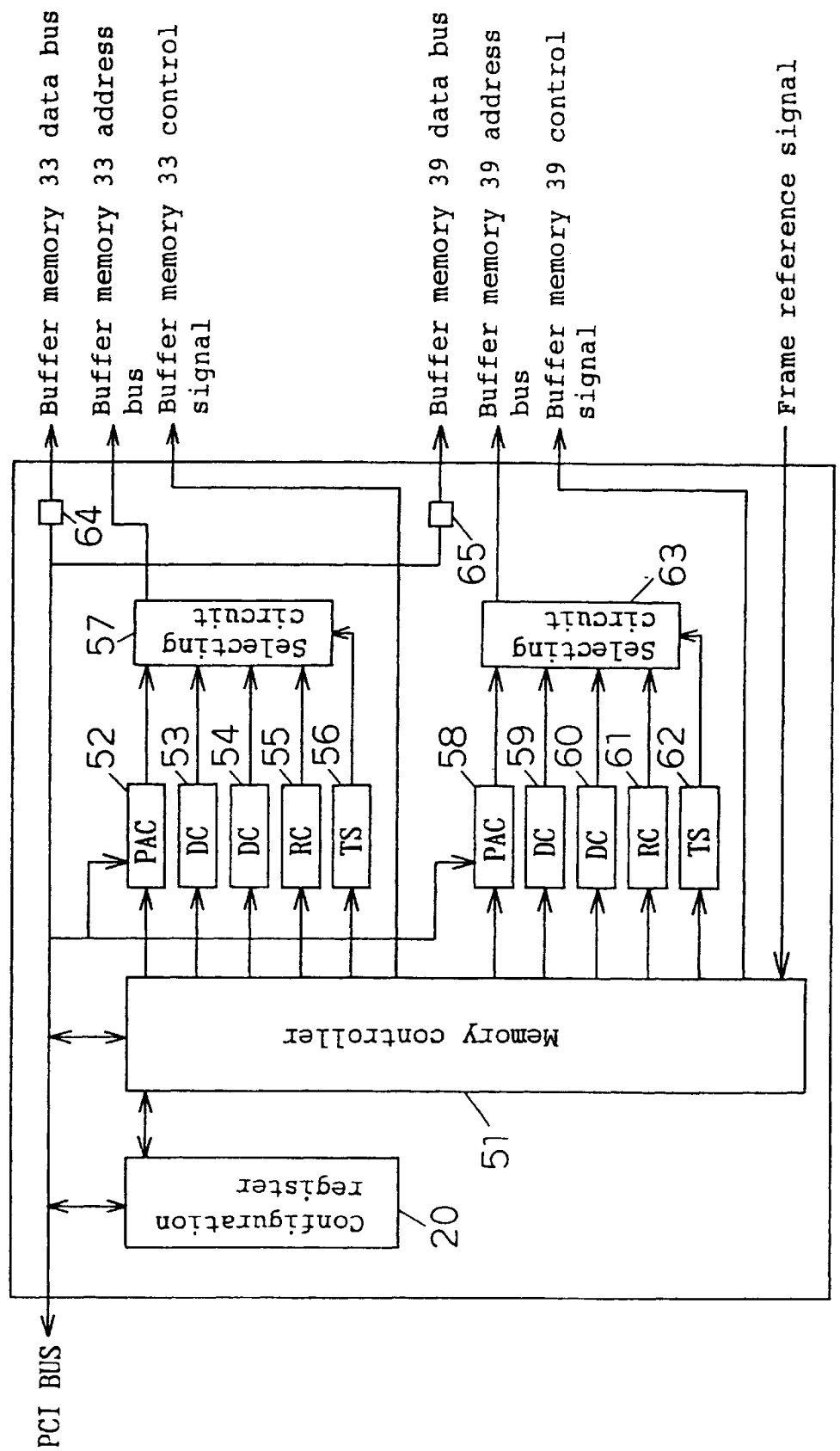
FIG. 10 is a block diagram of a data input/output circuit in the second embodiment of the invention.

FIG. 10 is a block diagram of the control circuit 31. Reference numeral 51 denotes a memory control circuit; 52 and 58, PCI address counters (PAC); 53, 54, 59 and 60, data counters (DC); 55 and 61, refresh counters (RC); 56 and 62, target states (TS); 57 and 63, selecting circuits; and 64 and 65, switches.

The memory control circuit 30 is a circuit to control the addresses and control lines of the memory 33 and memory 39. The PAC 52 and PAC 58 count the write address and read address of the PCI BUS to the AV data output circuit 8. The DC 53 is an address counter for transferring AV data from the memory 33 to the buffer 34; the DC 54, an address counter for transferring AV data from the memory 33 to the buffer 37; the DC 59, an address counter for transferring AV data from the memory 39 to the buffer 40; and the DC 60, an address counter for transferring AV data to the memory 39 from the buffer 34.

The RC 55 is a counter for refreshing the memory 33, and the RC 61 is a counter for refreshing the memory 39. The TS 56 is a state machine for controlling accesses to the memory 33, and the TS 62 is a state machine for controlling accesses to the memory 39. The address selecting circuit 57 is a circuit for selecting addresses outputted by the PAC 52, DC 53, DC 54 and RC 55 according to the state of the TS 56 and outputting them to the memory 33, and the address selecting circuit 63 is a circuit for selecting addresses outputted by the PAC 58, DC 59, DC 60 and RC 61 according to the state of the TS 62 and outputting them to the memory 33.

A switch 64 is turned ON when AV data are to be written into the memory 33 from the PCI BUS, and a switch 65 is turned ON when AV data are to be written into the memory 39 from the PCI BUS.

Figure 11:
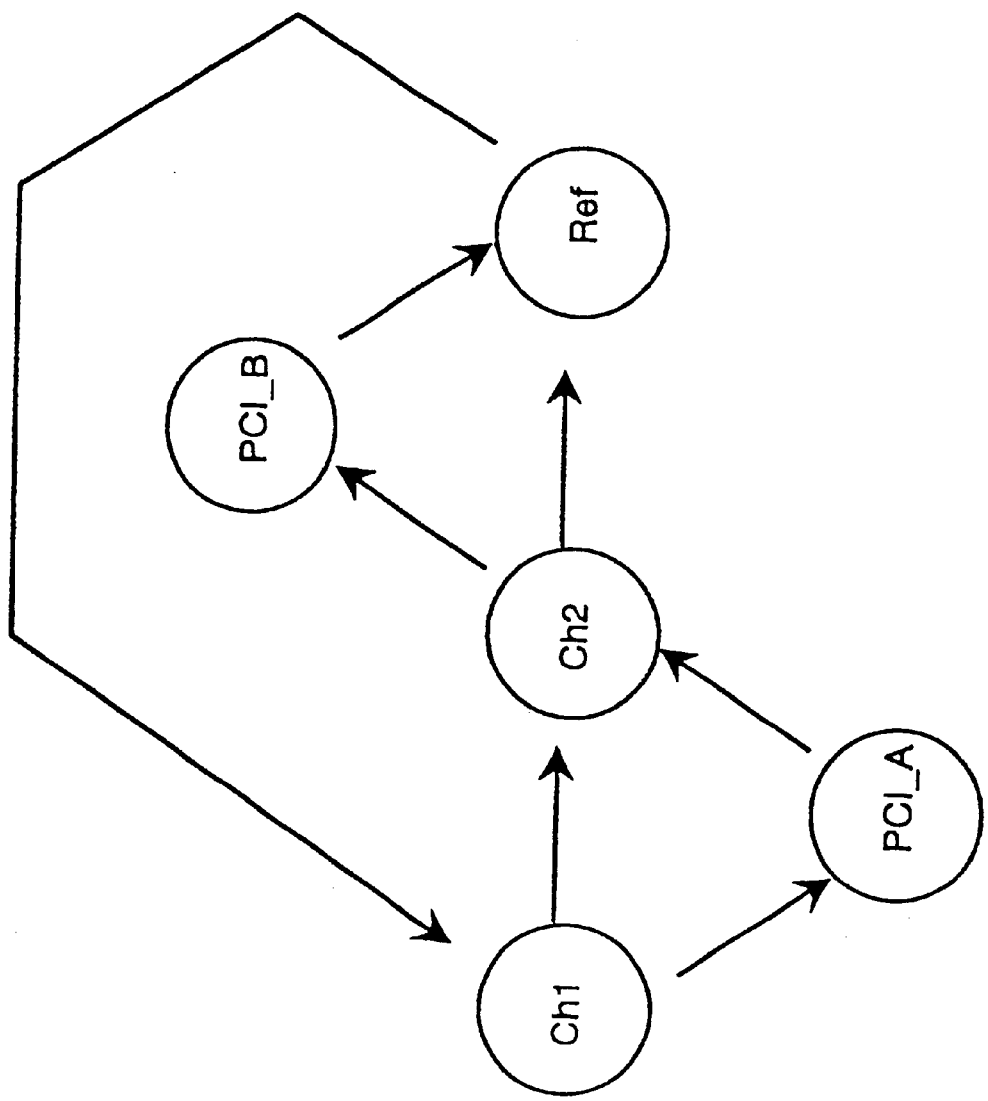
FIG. 11 is a state transition diagram of a memory control circuit in the second embodiment of the invention.

FIG. 11 shows a state transition diagram of the TS 56. CH1 denotes a phase in which AV data of the memory 34 are transferred to the buffer 34 on Channel 1; CH2, a phase in which AV data of the memory 34 are transferred to the buffer 36 on Channel 2; REF, a phase in which the memory 34 is refreshed; and PCI__A and PCI__B, phases in which write AV data from the PCI BUS are written into the memory 33.

In the phase CH1 or CH2, prescribed units of AV data are outputted from the memory 33 to the buffer 34 or 36. However, if writing into the memory 33 arises during a transfer, the current transfer is immediately suspended, and a transition to PCI__A takes place in case of CH1 or to PCI__B in case of CH2. In the PCI__A and PCI__B phase, AV data requested from the PCI BUS are written in. After the completion of writing, a transition takes place to CH2 in case of PCI__A or to the REF phase in case of PCI__B. If prescribed units of AV data from the memory 33 have been transferred in the CH1 or CH2 phase, a transition to CH2 takes place in case of CH1 or to the REF phase in case of CH2. In the REF phase, the memory 33 is refreshed, and a transition to the CH1 phase takes place.

Figure 12:
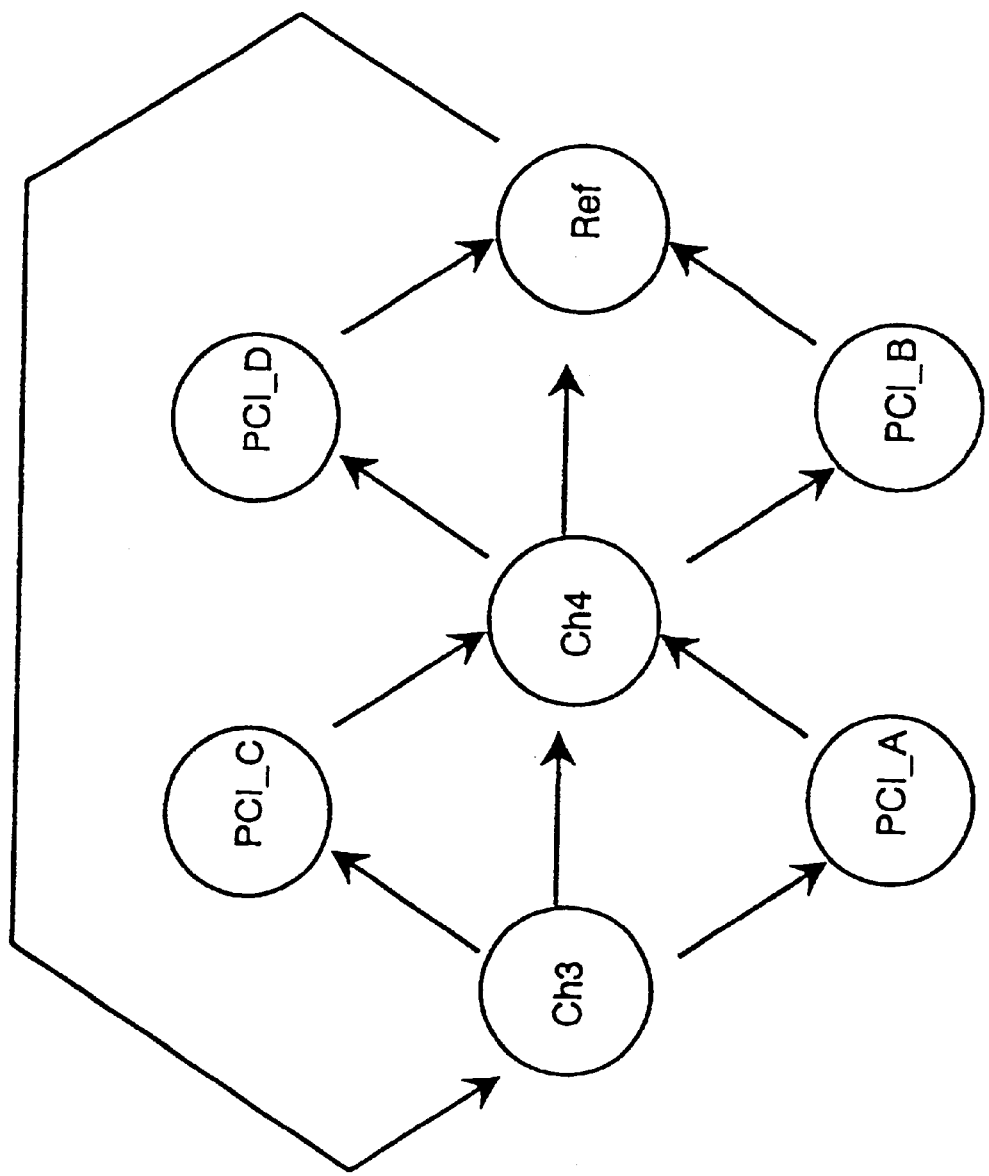
FIG. 12 is a state transition diagram of the memory control circuit in the second embodiment of the invention;.

FIG. 12 shows a state transition diagram of the TS 62. CH3 denotes a phase in which AV data of the memory 39 are transferred to the buffer 40 on Channel 3; CH4, a phase in which AV data are transferred from the buffer 42 on Channel 4 to the memory 39; REF, a phase in which the memory 39 is refreshed; PCI__A and PCI __B, phases in which write AV data from the PCI BUS are written into the memory 33; and PCI__C and PCI__D, phases in which AV data are written from the memory 39 to the PCI BUS.

In the phase CH3, prescribed units of AV data are outputted from the memory 39 to the buffer 40, and in the phase CH4, prescribed units of AV data are outputted to the memory 39 from the buffer 40. However, if writing into the memory 39 arises during a transfer, the current transfer is immediately suspended, and a transition to PCI__A takes place in case of CH3 or to PCI__B in case of CH4. Or, if reading into the memory 39 arises during a transfer on CH3 or CH4, the current transfer is immediately suspended, and a transition to PCI__C takes place in case of CH3 or to PCI__D in case of CH4. In the PCI__A and PCI__B phase, AV data requested from the PCI BUS are written in. After completion of reading, a transition takes place to CH2 in case of PCI_A or to REF phase in case of PCI B. In the PCI_C and PCI_D phase, AV data requested from the PCI BUS are read out. After the completion of reading, a transition takes place to CH2 in case of PCI_C or to the REF phase in case of PCI_D. If prescribed units of AV data from the memory 39 have been transferred in the CH3 or CH4 phase, a transition to CH4 takes place in case of CH3 or to the REF phase in case of CH4. In the REF phase, the memory 39 is refreshed, and a transition to the CH3 phase takes place.

When the transfer of one frame is accomplished in one frame period, nothing is done in the CH1, CH2, CH3 or CH4 phase, and a transition to the next CH2, REF, CH4 or REF phase takes place. For instance, if AV data of one frame are 128 KB, and the AV data of 128 KB of that frame are transferred to the buffer 12A in the CH1 phase, no transfer of AV data takes place until the next frame period in the CH1 phase, but an immediate transfer to the CH2 phase takes place. The frame period is determined according to the inputted frame reference signal.

The PAC 52, a counter for outputting the address of the PCI BUS in the AV data phase, sets the signal AD of the PCI BUS in the address phase of writing into the memory 33, and is incremented by 4 in each AV data phase.

The PAC 58, a counter for outputting the address of the PCI BUS in the AV data phase, sets the signal AD of the PCI BUS in the address phase of writing into or reading out of the memory 39, and is incremented by 4 in each AV data phase.

The DC 53, DC 54, DC 59 and DC 60 are counters incremented at every AV data transfer in the CH1, CH2, CH3 and CH4 phases, respectively; the DC 53 indicates the address in the memory 33 of AV data transferred from the memory 33 to the buffer 34; the DC 54, the address in the memory 33 of AV data transferred from the memory 33 to the buffer 36; the DC 59, the address in the memory 39 of AV data transferred from the memory 39 to the buffer 40; and the DC 60, the address in the memory 39 of AV data transferred from the buffer 42 to the memory 39.

The RC 55, a refresh counter for the memory 33, increments the RAW address by 1 every time it refreshes the memory 33.

The RC 61, a refresh counter for the memory 39, increments the RAW address by 1 every time it refreshes the memory 39.

In this embodiment, as in the Embodiment 1, a transfer from a decoder and an encoder to a memory can be accomplished without affecting a transfer on the PCI bus and, moreover, the presence of two memories makes possible, during a transfer to or from a decoder or an encoder, a transfer on the PCI bus using another memory. As a result, the utilization efficiency of the PCI bus can be made even higher than that of the Embodiment 1, and accordingly can realize high speed inputting and outputting of AV data.

Embodiment 3

Figure 13:
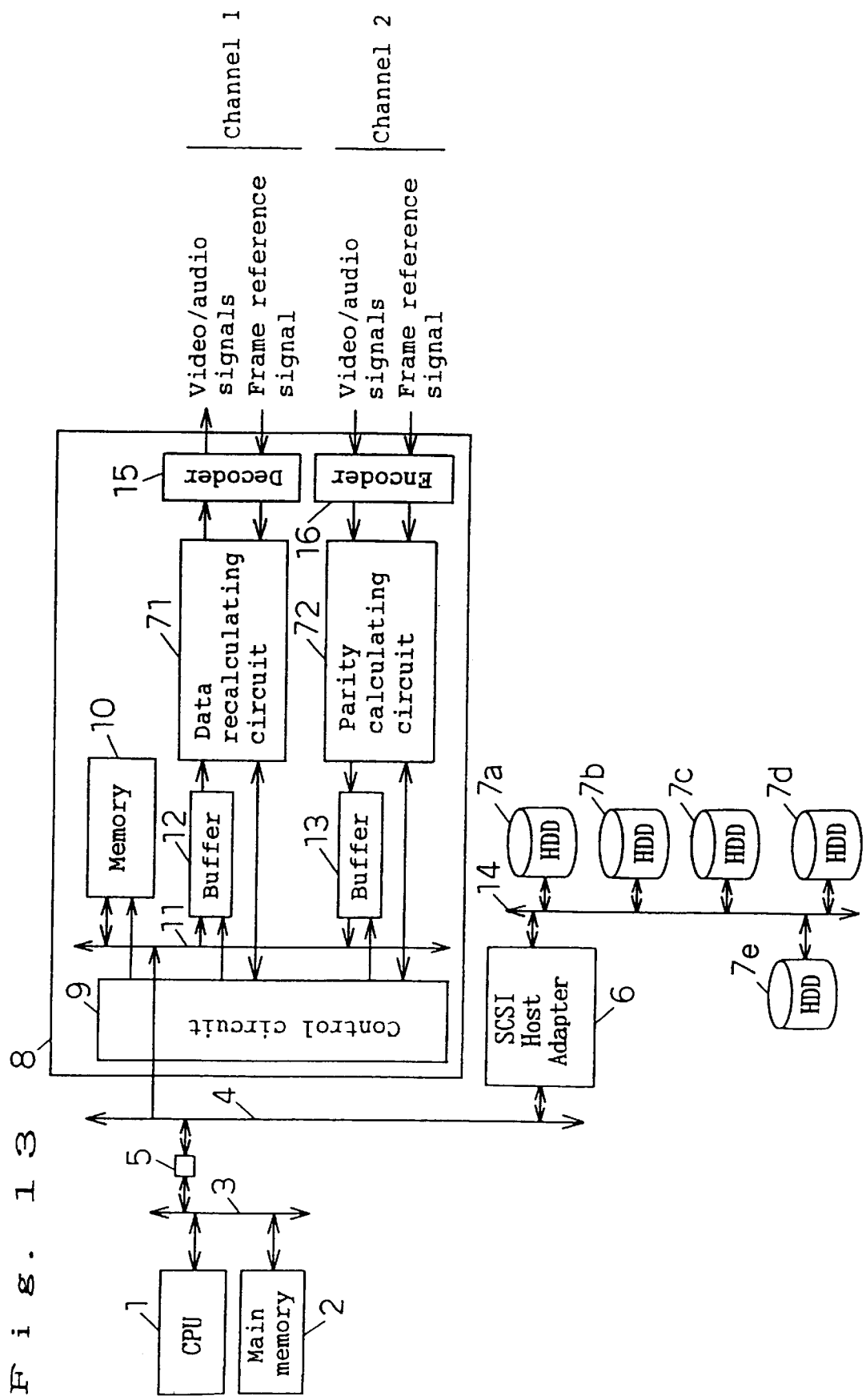
FIG. 13 is a block diagram of an AV data input/output apparatus, which is a third embodiment of the present invention.

FIG. 13 is a diagram illustrating a third embodiment of carrying out the present invention. Reference numeral 72 denotes a parity calculating circuit, and 71, a data recalculating circuit. Other constituent elements are the same as in the first embodiment.

Video and audio signals are inputted to the encoder 16 to undergo highly efficient encoding, and inputted to the parity calculating circuit 72 as AV data. In the parity calculating circuit 71, one frame of AV data is divided into four series of An (n=0, 1, ..., 31999), Bn (n=0, 1, ..., 31999), Cn (n=0, 1, ..., 31999), Dn (n=0, 1, ... 31999). One frame of AV data here is supposed to be 128 KB. Further, parity series Pn (n=0, 1, ... 31999) is generated from the four series. The formula of generation is:

$$P_m = A_m \$ B_m \$ C_m \$ D_m (m=0, 1, \ldots, 31999, \$ \text{ is an exclusive OR})$$ [Formula 1]

Figure 14:
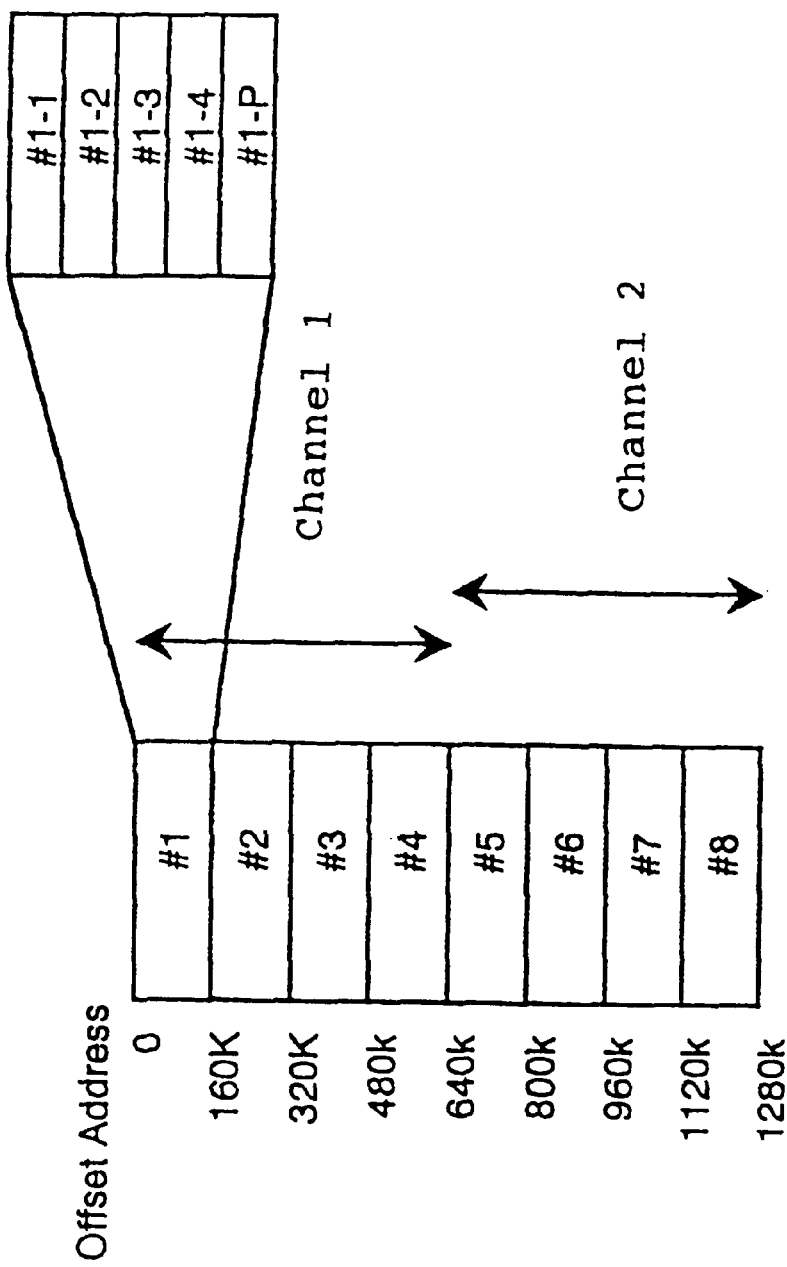
FIG. 14 is a mapping chart of a memory in the third embodiment of the invention.
Figure 15:
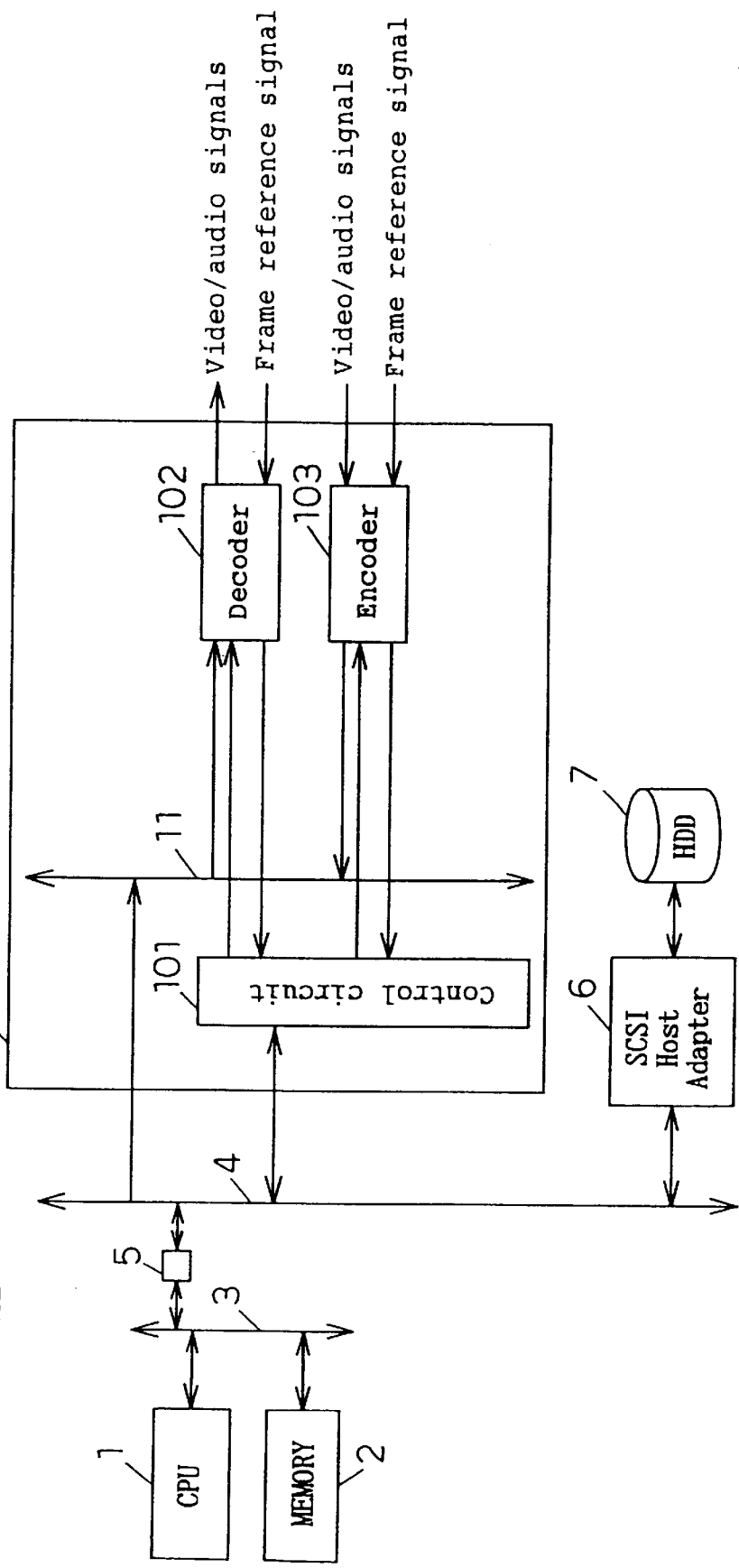
FIG. 15 is a block diagram of an AV data input/output apparatus according to the prior art.

FIG. 14 shows address mapping of the memory 10. The memory 10 is divided into address spaces of 160 KB each, and each is assigned one or another of #1 through #8. Regarding inputting from Channel 1, areas #1 through #4 are used. Each area is further subdivided into five. For instance, #1 is subdivided into #1-1, #1-2, #1-3, #1-4 and #1-P. The control circuit 9 controls addresses in the memory 10 so that, as divided by the parity generation circuit 71, the data of An be recorded in #1-1, the data of Bn, in #1-2, the data of Cn in #1-3, and the data of Dn, in #1-4, and the generated parity Pn, in #1-P. Five HDDs 7 are provided, each denoted by HDD 7a, 7b, 7c, 7d and 7e.

When AV data, converted from video and audio signals inputted from Channel 1 are to be recorded into the HDDs 7, the program stored in the main memory 2 instructs the SCSIHA 6 to store AV data stored in area #1-1 of the memory 10 into the HDD 7a, AV data stored in area #1-2 into the HDD 7b, AV data stored in area #1-3 into the HDD 7c, AV data stored in area #1-4 into the HDD 7d, and AV data stored in area #1-P into the HDD 7e. Similarly, the areas of #2 through #4 are also subdivided into five each, using the five HDDs 7 for recording. In this manner, AV data are recorded in the HDDs 7a through 7d, and parity data calculated from AV data are recorded in the HDD 7e.

When video and audio data are to be outputted, the program instructs the SCSIHA 6 to read AV data and parity out of the HDDs 7a, 7b, 7c, 7d and 7e and write them into the memory 10. On this occasion, data from the HDD 7a are written into areas ending with 1, the data of HDD 7b into areas ending with 2, the data of the HDD 7c into areas ending with 3, the data of the HDD 7d into areas ending with 4, and the data of the HDD 7e into areas ending with P.

Hereupon, if the writing of data from any one HDD into the memory 10 is delayed by any cause, the control circuit 9 indicates to the data recalculating circuit 71 the number of the area in delay. The control circuit 9 outputs one frame of AV data and parity from the memory 10 to the data recalculating circuit. The data recalculating circuit 71, in the absence of delayed data, outputs the AV data to the decoder 15. If any data are delayed, the delayed AV data are recalculated from the remaining AV data and parity, and outputs them to the decoder 15.

The recalculation will be explained here. As in case of inputting, the AV data are denoted. by An, Bn, Cn and Dn, and the parity data by Pn. Hereupon, when the writing of data from the HDD 7a into an area ending with 1 is delayed, An is calculated from Bn, Cn, Dn and Pn by the following formula.

$$A_m = P_m \$ B_m \$ C_m \$ D_m (m=0, 1, \ldots, 31999, \$ \text{ is an exclusive OR})$$ [Formula 2]

As hitherto described, even if the writing of AV data into the memory 10 is delayed by HDD trouble or any other cause, the AV data can be restored completely restored by recalculation.

Industrial Applicability

According to the present invention, continued outputting of AV data is made possible even in the event of HDD trouble and thereby to make great contributions to enhancing the reliability merely by adding a simple parity generating circuit and a data recalculating circuit to the data input/ output circuit.

What is claimed is:

1. A video data output apparatus provided with a computer bus; storing means, connected to said bus, for storing video or audio data (hereinafter data); and output means, connected to said bus, for outputting the data, characterized in that:

said output means has a memory for buffering said data; speed change means for changing the speed of said data; a second bus for connecting said memory, said speed change means and said bus; decoding means for decoding said data into video and audio signals; and control means for writing said data, written from said storing means into said output means via said bus, into said memory via said second bus, further reading said data out of said memory and transferring them to said speed change means via said second bus; and in accordance with an inputted frame reference signal, said control means outputs data of a frame from said memory to said speed change means in every fixed period of time t1, and said decoder reads the data of the frame at said speed change means in every fixed period of time t1 in a predetermined format and decodes said data.

2. The video data output apparatus according to claim 1, characterized in that said control means performs said data transfer from said memory to said speed change means when no writing from said storing means to said memory is taking place, and, if a request to write from said storing means to said memory arises during the transfer of said data, immediately suspends said data transfer and performs said data transfer from said storing means to said memory.

3. A video data input/output apparatus provided with a computer bus; storing means, connected to said bus, for storing data; and input/output means, connected to said bus, for inputting and outputting the data, characterized in that:

said input/output means has a memory for buffering said data; speed change means for changing the speed of said data; second bus for connecting said memory, said speed change means and said bus; decoding means for decoding said data into video and audio signals; encoding means for converting video and audio signals into data; and control means for writing said data, written from said storing means into said input/output means via said bus, into said memory via said second bus, further transferring them from said memory to said speed change means via said second bus, or writing said data out of said speed change means into said memory via said second bus, and further outputting, when a read request is received from said storing means, said requested data from said memory to said storing means via said bus; and in accordance with an inputted frame reference signal, said control means inputs/outputs data of a frame from said memory to said speed change means in every fixed period of time t1, and said decoder reads data of a frame at said speed change means in every fixed period of time t1 in a predetermined format and decodes said data.

4. The video data input/output apparatus according to claim 3, characterized in that said control means performs said data transfer from said memory to said speed change means and said data transfer from said speed change means to said memory when no writing or reading from said storing means to said memory is taking place, and, if a request to write from said storing means to said memory or a request to read out of said memory arises during the transfer of said data, immediately suspends said data transfer and performs writing from said storing means to said memory or reading out of said memory to said storing means.

5. A video data input/output apparatus provided with a computer bus; storing means, connected to said bus, for storing data; and input/output means, connected to said bus, for inputting and outputting the data, characterized in that:

said input/output means has first and second memories for buffering said data; first and second speed change means for changing the speed of said data; a second bus for connecting said first memory, said first speed change means and said bus; a third bus for connecting said second memory, said second speed change means and said bus; decoding means for decoding said data into video and audio signals; encoding means for converting video and audio signals into data; and control means for writing said data, written from said storing means into said input/output means via said bus, into said first and second memories via said second and third buses, further transferring them from said first and second memories to said second and third speed change means via said second and third buses, or writing said data out of said second speed change means into said first and second memories via said second and third buses, and further outputting, in compliance with a request from said storing means, the data from said first and second memories to said bus; and said control means performs said data transfer from said first memory to said first speed change means and said data transfer from said first speed change means to said first memory when no writing or reading from said storing means to said first memory is taking place, and, if a request to write from said storing means to said first memory and a request to read out of said first memory arise during the transfer of said data, immediately suspends said data transfer and performs writing from said storing means to said first memory or reading out of said first memory to said storing means; and performs said data transfer from said second memory to said second speed change means and said data transfer from said second speed change means to said second memory when no writing or reading from said storing apparatus to said second memory is taking place, and, if a request to write from said storing means to said second memory and a request to read out of said second memory arise during the transfer of said data, immediately suspends said data transfer and performs writing from said storing means to said second memory or reading out of said second memory to said storing means.

6. A video data input/output apparatus provided with a computer bus; storing means, connected to said bus, for storing data; and input/output means, connected to said bus, for inputting and outputting the data, characterized in that:

said input/output means has a memory for buffering said data; speed change means for changing the speed of said data; a second bus for connecting said memory, said speed change means and said bus; a decoding means for decoding said data into video and audio signals; encoding means for converting video and audio signals into data; parity generating means for generating a parity from the output of said encoding means; data regenerating means for regenerating from part of said data and said parity the remaining data; and control means for writing said data, written from said storing means into said input/output means via said bus, and said parity into said memory via said second bus, further transferring them from said memory to said speed change means via said second bus, instructing said data generating means, when the writing of data from said storing means to said memory has delayed, to recalculate the data whose writing has delayed from the written data and parity, or writing said data out of said speed change means into said memory via said second bus, and further outputting, in compliance with a reading request from said storing means, said requested data from said memory to said storing means via said bus; and in accordance with an inputted frame reference. signal, said control means inputs/outputs data of a frame of said data from said memory to said speed change means in every fixed period of time t1, and said decoder reads data of a frame at said speed change means in every fixed period of time t1 in a predetermined format and decodes said data.

7. The video data input/output apparatus according to claim 6, characterized in that said control means performs said data transfer from said memory to said speed change means and said data transfer from said speed change means to said memory when no writing or reading from said storing means to said memory is taking place, and, if a request to write from said storing means to said memory or a request to read out of said memory arises during the transfer of said data, immediately suspends said data transfer and performs writing from said storing means to said memory or reading out of said memory to said storing means.

8. The video data input/output apparatus according to claim 7, characterized in that said storing means comprises n HDDs, one frame of data is divided into 1/(n−1), each divided part of data is stored in one of said n−1 HDDs, and a generated parity is stored in the remaining 1 HDD.

* * * * *

UNITED STATES PATENT AND TRADEMARK OFFICE
CERTIFICATE OF CORRECTION

PATENT NO.      : 6,449,668 B1                              Page 1 of 1
DATED           : September 10, 2002
INVENTOR(S)     : Shinji Hamai et al.

It is certified that error appears in the above-identified patent and that said Letters Patent is hereby corrected as shown below:

<u>Title page,</u>
Item [86], PCT No., change "PCT/JP99/00100" to -- PCT/JP99/00108 --

Signed and Sealed this

Eighth Day of April, 2003

JAMES E. ROGAN
*Director of the United States Patent and Trademark Office*